Sept. 8, 1970 K. S. WOOD 3,527,032
CUTTER SECTION FOR MULTISECTION MOWER
Original Filed Dec. 12, 1966 2 Sheets-Sheet 1
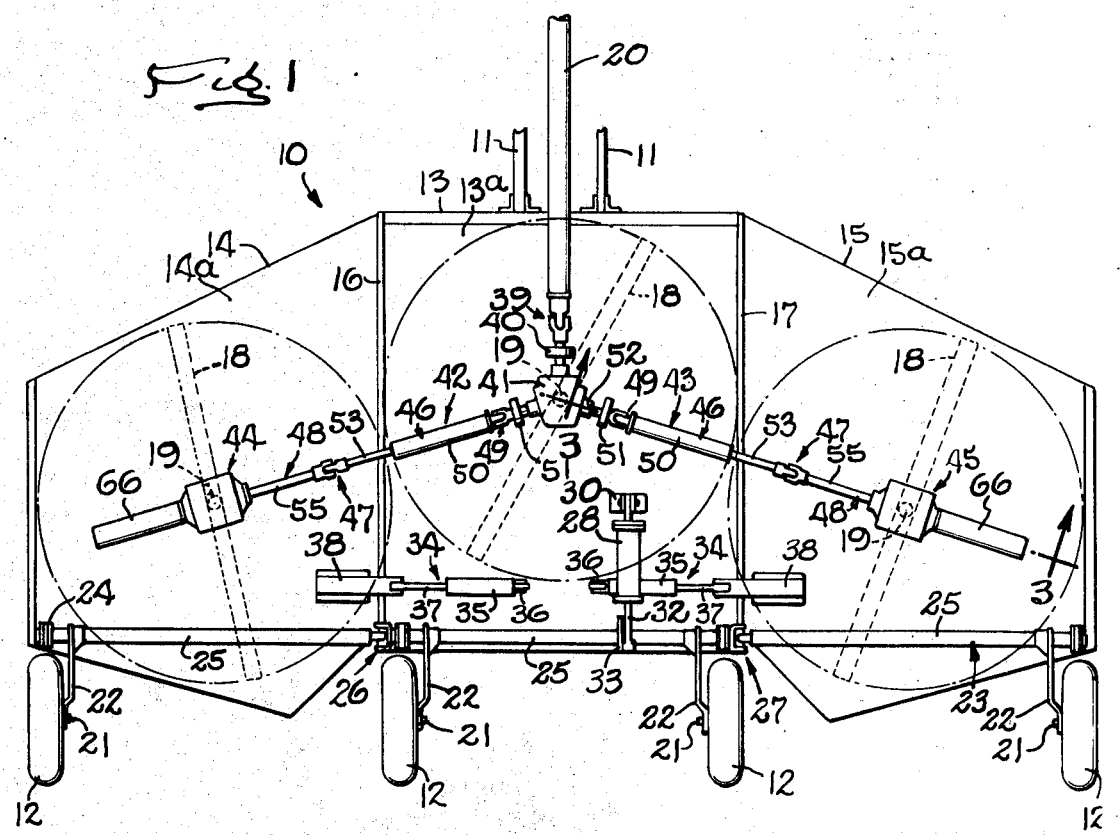
INVENTOR
Keith S. Wood
By Wolfe, Hubbard, Voit & Osann
ATTORNEY

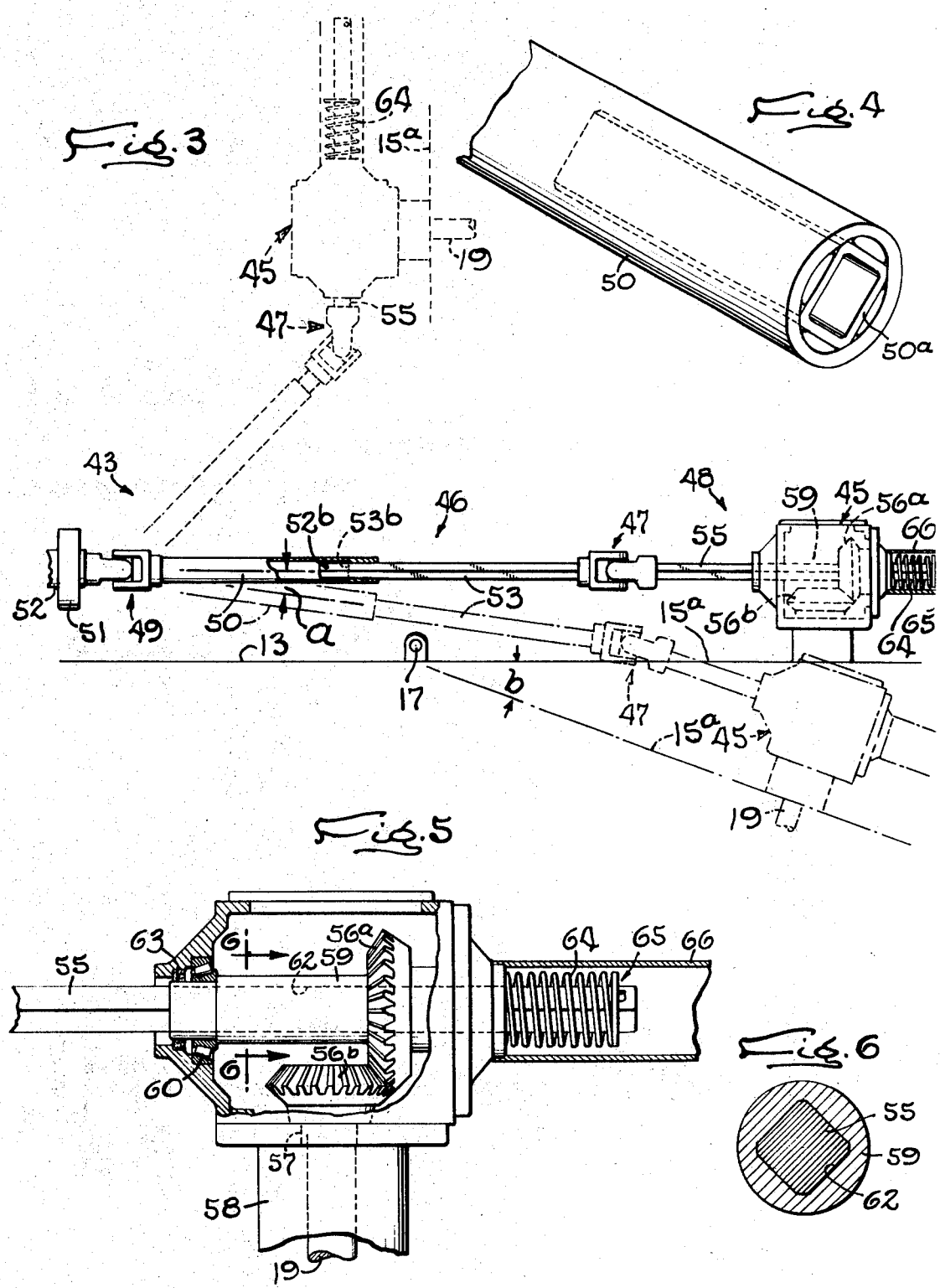

United States Patent Office 3,527,032
Patented Sept. 8, 1970

3,527,032
CUTTER SECTION FOR MULTISECTION MOWER
Keith S. Wood, Oregon, Ill., assignor, by mesne assignments, to Hesston of Delaware, Inc., Wilmington, Del., a corporation of Delaware
Continuation of application Ser. No. 600,852, Dec. 12, 1966. This application Aug. 7, 1969, Ser. No. 850,693
Int. Cl. A01d 75/30
U.S. Cl. 56—6      9 Claims

ABSTRACT OF THE DISCLOSURE

A drive shaft for a multi-section mower of the type in which a wing section is hinged to a center section and can swing about the hinge to positions above and below the plane of the center section. The drive shaft is connected between a main gearbox on the center section and a gearbox on the wing section to transmit power to the wing gearbox to drive a mower blade on the wing section. To maintain a driving connection between the gearboxes as the wing section swings, the drive shaft comprises two telescoping sections. The first telescoping section is joined by a first universal joint at one end to one end of the second telescoping section and by a second universal joint at the opposite end to the main gearbox. The second telescoping section telescopes into the wing gearbox. With this arrangement, the first universal joint can be positioned close to the hinge when the wing section swings below the plane of the center section thus allowing the drive shaft to be mounted on the mower closer to the housing of the mower. Additionally, the second telescoping section may be spring biased toward a fully telescoped portion to maintain the first universal joint near the wing gearbox when the wing is raised to generally vertical positions thus keeping the bend in the two universal joints generally equal when the wing is raised.

CROSS-REFERENCE TO RELATED APPLICATION

This application is a continuation of application Ser. No. 600,852 now abandoned, filed Dec. 12, 1966.

BACKGROUND OF THE INVENTION

This invention relates to a drive arrangement for transmitting power between two power transmitting devices, one on each of two frames which are joined together by a hinge for pivotal movement of one frame relative to the other. More particularly, this invention relates to a drive arrangement for a mower of the type in which a plurality of sections are hinged together with a separate cutting blade mounted on each section and in which a telescoping drive shaft extends between a gearbox connected to the cutting blade on a first section and a gearbox connected to the cutting blade on a second section to transmit power from one gearbox to the other to drive the cutting blade mounted on the second section. In this type of mower, the second section may be pivoted relative to the first section about the hinge connection to positions above and below the plane of the first section which is generally horizontal to allow the mower to cut grass on uneven ground and may be swung to a generally vertical position to allow the mower to pass through narrow places. To keep a driving connection between the gearboxes as the second frame swings relative to the first section and the distance between the gearboxes lengthens or shortens, the drive shaft must expand or telescope to accommodate the changes in distance between the gearboxes, and two universal joints are placed in the drive shaft to allow the drive shaft to transmit power as the relative positions of the gearboxes change.

SUMMARY OF THE INVENTION

The primary object of the present invention is to provide a drive shaft simple in construction which will maintain a continuous drive between the gearboxes while compensating for the change in spacing as the sections pivot relative to one another about the hinge so that the gearboxes may be shorter and the drive shaft may be journaled closer to the housing of the sections than has been possible with devices heretofore known.

It is a related object to accomplish the above by constructing the drive shaft so that, when the second section is swung to a generally vertical position, one universal joint is positioned adjacent each gearbox but, when the second section is swung to positions below the level of the first gearbox one of the universal joints is moved away from one gearbox and positioned adjacent the hinge joint.

It is a more detailed object to accomplish the above by providing the drive shaft with a single telescoping section between the universal joints and by connecting one end portion of the drive shaft to one of the gearboxes with a telescoping connection through the gearbox.

It is an object to force the drive shaft to telescopingly expand between the universal joints before the drive shaft slides in the gearbox to move one universal joint away from the gearbox when one section is swung to positions below the other.

It is a related object to accomplish the above by providing a spring on the drive shaft to retard sliding movement of the telescoping connection through the gearbox until after the telescoping section between the universal joints completely expands.

Other objects and advantages of the invention will become apparent from the following detailed description taken in connection with the accompanying drawings.

BRIEF DESCRIPTION OF THE DRAWINGS

FIG. 1 is a top plan view of a multi-section mower embodying the novel features of the present invention.

FIG. 2 is an elevation view of the mower with the right wing section pivoted to the vertical position above the plane of the center section, and showing in dotted outline the left wing section pivoted below the plane of the center section.

FIG. 3 is a fragmentary enlarged elevation view, partially in cross-section and taken along the line 3—3 of FIG. 1, showing the various positions of the drive arrangement as the associated wing section is pivoted above and below the center section.

FIG. 4 is a fragmentary perspective view of one telescoping member of the drive shafts.

FIG. 5 is a fragmentary enlarged view, partially in cross-section, of one of the wing section gearboxes.

FIG. 6 is a cross-sectional view taken substantially along the line 6—6 of FIG. 5.

DESCRIPTION OF THE PREFERRED EMBODIMENT

In the drawings, the invention is illustrated as being embodied in a mowing implement 10 which preferably is attached to be pulled behind a tractor (not shown). The mower is supported at the front edge by a tongue 11 attached to the tractor, and by wheels 12 journaled at the back edge thereof, such that it rides in a generally horizontal position along the ground. The mower is made up of three sections 13, 14, and 15 each having a housing or frame 13a, 14a, and 15a, respectively, with the outer wing sections 14 and 15 being pivotally attached to the center section 13. For this purpose, hinges 16 and 17 connect the adjacent edges of the housing 13a and the wing housings 14a and 15a, respectively (FIGS. 1 and 2).

Each section includes a cutter or blade 18 supported on a shaft 19 to rotate in a plane parallel to the associated housing and powered through a main drive shaft 20 adapted to be connected to the power take-off shaft of the tractor. As the blades rotate, they cut grass or other material extending above the ground over which the mower is pulled. The sections are hinged together to permit one to pivot relative to the other so each section may follow the contour of the ground by riding along on the wheels 12, for cutting the grass at a uniform height. Also by pivotally attaching the wings 14 and 15 to the center section 13, each wing may be hoisted to a vertical position (as shown in FIG. 2) so the mower is narrow enough to be pulled through narrow spaces and along the roads and highways. In the example shown, the wing sections may be pivoted through an angle as much or more than 20 degrees below and 90 degrees above the plane of the middle section while the blades are rotating.

The wheels 12 supporting the mower are journaled on axles 21 supported by brackets 22. These brackets are fixed to a shaft 23 journaled in bearings 24 and extending across the back of all three housings. The shaft 23 is made up of shaft sections 25 connected end to end by universal joints 26 and 27 positioned adjacent the hinges 16 and 17 connecting the mower sections so the shaft may be tilted as the wing sections are pivoted about the section housing 13a. For controlling the height of the blades 18 above the ground, an actuator 28 guiding a piston (not shown) attached to a movable rod 32 is connected between a bracket 30 on the center housing 13a and a crank 33 on the center shaft 25. By regulating the flow of pressure hydraulic fluid to the actuator 28, the angular position of the brackets 22 and the wheels 12 about the shaft 23 may be adjusted. In this manner, the distance the housings and blades are supported above the ground is varied to regulate the cutting height of the mower. The pressure fluid preferably is obtained from the normal tractor hydraulic apparatus with the supply being controlled by the tractor operator.

The wing sections 14 and 15 are raised and lowered about the hinges 16 and 17 by hydraulic actuators 34 connected between the center mower section and the individual wing section housings. Each actuator includes a cylinder 35 attached at one end to a bracket 36 on the center housing 13a and enclosing a movable piston (not shown) fixed to a rod 37 extending to a bracket 38 on the wing section housing 14a and 15a. By supplying hydraulic fluid under pressure to either of the actuators, the associated wing may be raised from the normal horizontal position to the vertical position, as has the wing 15 shown in FIG. 2. The wing sections are lowered by gravity with release of the pressure fluid from the actuators.

The main drive shaft 20 of the mower is connected through a universal joint 39 and a safety slip clutch 40 to a main gearbox 41. This main gearbox is positioned directly above the vertical shaft 19 mounting the blade 18 of the center mower section. While the specific details of the main gearbox are not shown, the type is well known and generally comprises a power transmitting device including a series of gears engaged to power the vertical shaft 19 and thus drive the cutting blade. The main gearbox additionally includes other gears engaged for powering the wing drive shafts 42 and 43 leading respectively to wing gearboxes 44 and 45. The wing gearboxes form a power transmitting device for rotating the shafts 19 and the attached cutting blades 18. Thus, as the mower is pulled along the ground, the blades of each mower section are rotated simultaneously to cut the grass, the blades being powered by the tractor power take-off shaft acting through the main and wing drive shafts. While the blades do not overlap, the wing sections are offset (FIG. 1) somewhat behind the center mower section 13 and, as the mower is pulled directly forward, the paths taken by the blades of each wing overlap with the path taken by the center section blade for cutting a continuous strip of grass.

In accordance with the present invention, each of the wing drive shafts 42, 43 positioned between the main gearbox 41 and the respective wing gearbox 44, 45 comprises a first telescoping section 46 positioned between the main gearbox and the wing gearbox and a second telescoping section 48 extending slidably into the respective wing gearbox with a universal joint 47 connected between the telescoping sections and a universal joint 49 connected between the first telescoping section and the main gearbox. With this drive arrangement, the length of each drive shaft and the angular position of the shaft ends may change to maintain a driving connection between the main gearbox and the gearbox on each associated wing as the associated wing pivots about the supporting hinge and, when the wing is pivoted to positions below the plane of the center section 13, the second telescoping section extends to locate the universal joint 47 adjacent the associated hinge 16, 17 thus allowing the drive shaft to bend near the hinge to keep the drive shaft from engaging the hinge during lowering of the wing while allowing the drive shaft to be journaled closer to the frames than has been possible heretofore. Moreover, when the wing is pivoted upwardly above the center section 13, the universal joint 47 is positioned adjacent the associated wing gearbox thus allowing the first telescoping section to occupy the full distance between the gearboxes while keeping the universal joints bent at generally equal angles.

Accordingly, each of the wing drive shafts 42 and 43 includes the first telescoping section 46 connecting through the universal joint 47 to the second telescoping section 48. The wing drive shafts are coupled to the main gearbox 41 by means of the second universal joint 49. The first telescoping section 46 comprises an outer sleeve 50 (FIGS. 1–4) with a square insert 50a fixed therein. This outer shaft is connected through the universal joint 49 and a safety clutch 51 to an aligned output shaft 52 leading from the main gearbox 41. A square drive shaft 53 slides into the insert 50a to form a sliding torque-transmitting connection therewith, and in turn is connected at the free end by the second universal joint 47 to a second square shaft 55. The shaft 53 has a pin 52b extending through the end of the shaft, the pin preventing the shaft from sliding out of the sleeve 50 when the pin engages an abutment 53b (FIG. 3). The second telescoping sections 48 complete the connections to the wing gearboxes 44 and 45.

Each wing gearbox includes mated bevel gears 56a and 56b (FIGS. 3 and 5), with the gear 56b being fixed directly to one end of the associated vertical shaft 19 leading through the wing housing to the cutter blade. This cutter supporting shaft 19 is journaled at 57 in the gearbox housing 58. The gear 56a is fixed on a sleeve 59 which turns within housing supported on roller bearings 60 about an axis perpendicular to that of gear 56b. This sleeve 59 includes a square center opening 62 into which the square drive shaft 55 slides to form the second sliding torque-transmitting connection between the main and the wing gearboxes. Oil seals 63 between the housing 58 and each end of the sleeve 59 retain lubricating fluid within the gearbox housing for the bevel gears. The sleeve 59 provides a bearing of substantial length for the shaft 55 and thus supports the universal joint 47 rigidly in all of its positions.

It is well known that a pair of universal joints can impart a pulsating angular motion to the drive in which they are connected when rotated while in a bent configuration. Because of this, the universal joints 47 and 49 in this drive arrangement are fixed to the drive shaft in a predetermined phase relationship. That is, the joints are rotated relative to each other at an angle of 90 degrees measured about the shaft axis so that each offsets the acceleration of the other to limit the annular acceleration and deceleration of the shaft telescoping section 46 as the latter is swung with the associated wing section to positions above or below the plane of the center section 13.

In operation, the wings 14 and 15 may be pivoted about the hinges 16 and 17, respectively, from below the plane of the center housing 13 to the upwardly extending position, with the inner shaft 53 sliding within the outer sleeve 50 and the shaft 55 sliding within the sleeve 59 connected to the bevel gears 56a to accommodate the change in spacing between the main and wing gearboxes and maintain a drive connection therebetween. At the same time, the universal joints 47 and 49 allow for misalinement of the shaft ends connected to the gearboxes. Since more than one sliding connection is used along the drive shaft, with each compensating for a portion of the change in length of the drive shaft, the telescoping section 46 may be made proportionally shorter in length than would be necessary if only one telescoping section were used.

As shown in the upper phantom lines in FIG. 3, when the wing 15 is swung to a vertical position and forms a right angle with the center section 13, the first telescoping section 46 is telescoped and the shaft 55 of the second telescoping section 48 is telescoped into the sleeve 59 thus positioning the universal joint 47 adjacent the gearbox 45. As the wing is swung down to positions below the plane of the center housing, both the first and the second telescoping sections extend thus moving the universal joint 47 away from the gearbox 45 and positioning the universal joint 47 near the hinge 17. The positioning of the universal joint 47 near the hinge when the wing section is below the plane of the center section allows the drive shaft 43 to bend near the hinge so that the sleeve 50 moves through a smaller angle a (FIG. 3) than the angle b through which the wing section moves. With this arrangement, the universal joint 47 can be positioned close to the hinge connecting the wing section to the center section when the wing section swings below the plane of the center section because the drive shaft 43 bends near the hinge and maintains a clearance between the drive shaft and the hinge. Thus, the drive shafts 42 and 43 between the gearboxes may be supported closer to the mower housing permitting a lowering of the overall height of the mower.

Preferably but not necessarily, a compression spring 64 is placed on the shaft 55 and between each wing gearbox housing 58 and a pin and washer 65 (FIG. 5) on the end of each shaft 55. This compression spring serves to bias the telescoping section 48 toward a fully telescoped position causing the first telescoping section 46 to expand first as the wing is lowered. When the pin 52b engages the abutment 53b, the first telescoping section can expand no further and, if the wing 15 is lowered further, the shaft 55 slides in the sleeve 59 against the force of the spring. With this arrangement, the universal joint 47 is kept close to the gearbox 48 when the wing section is raised but is positioned close to the hinge 17 when the wing section is lowered below the plane of the center section 13. By keeping the universal joint 47 away from the hinge when the wing section is raised to vertical positions, the universal joints 47 and 49 are maintained about the same distance from the hinge so that each universal joint will carry approximately the same angle of bend. This avoids one of the joints being bent at a sharper angle than the other thus avoiding joint fighting and damage, such joint fighting and damage occuring when the bend angles of the joints are not equal and 90 degrees out of phase with one another due to the inherent non-constant velocity in bent universal joints.

It will be observed that the provision of the first telescoping section 46 positioned end-to-end with the second telescoping section 48 with the universal joint 47 connecting the two sections and the universal joint 49 joining the first telescoping section to the center gearbox 41 and with the second telescoping section telescoping into the associated wing gearbox 44, 45 is a particularly advantageous arrangement for the drive shafts 42, 43. With this arrangement, the universal joint 47 can be positioned near the associated wing gearbox, when the wing section 14, 15 is raised to positions above the plane of the center section 13, to keep the bend angles of the universal joints 47 and 49 nearly equal and, when the wing section is lowered below the plane of the center section, the universal joint 47 is positioned near the associated hinge 16, 17 to allow the drive shaft to bend near the hinge. With the drive shaft bending near the associated hinge, the drive shaft may be mounted on the mower closer to the mower housing thus permitting a lowering of the overall height of the mower.

I claim as my invention:

1. An agricultural implement comprising first and second frames joined together by a hinge connection whereby said second frame may pivot relative to said first frame to positions above and below the plane of said first frame, a first power transmitting device on said first frame, a second power transmitting device on said second frame, a cutting means connected to said second power transmitting device, and a drive shaft for transmitting power between said devices, said drive shaft comprising first and second power transmitting telescoping sections disposed end-to-end, a first universal joint connecting the adjacent ends of said telescoping sections, a second universal joint connecting the opposite end of said first telescoping section and said first device, said second telescoping section comprising a member slidably telescoped into said second device whereby said drive shaft is journaled close to said frames while maintaining a power transmitting connection between said devices by the swiveling of said universal joints and the lengthening and shortening of said telescoping sections as said second frame is pivoted relative to said first frame.

2. The implement of claim 1 in which said second telescoping section extends as said second frame is pivoted to positions below the plane of said first frame to position said first universal joint adjacent said hinge connection and, by the bending of said first universal joint, clearance is maintained between said hinge connection and said drive shaft whereby said drive shaft may be journaled close to said frames and still permit pivoting of said second frame below the plane of said first frame.

3. The implement of claim 1 in which said second power transmitting device includes power transmitting means, said second telescoping section further comprises a sleeve journaled in said second device with said sleeve being connected to and extending through said power transmitting means, and said member is telescoped into said sleeve and drivingly connected to said sleeve.

4. The implement of claim 1 further including yieldable means acting on said drive shaft for biasing said second telescoping section toward a fully telescoped position and forcing said first telescoping section to extend first so that said first universal joint is maintained adjacent said second power transmitting device when said second frame is pivoted to positions above the plane of said first frame.

5. The implement as defined in claim 1 wherein said power transmitting telescoping sections each comprise a telescoping sleeve and shaft section which are movable longitudinally relative to each other and include means for preventing relative rotation therebetween.

6. The implement of claim 1 in which said first universal joint is positioned adjacent said hinge connection when said second frame is pivoted to positions below the plane of said first frame and further including yieldable means for maintaining said first universal joint adjacent said second power transmitting device when said second frame is pivoted to positions above the plane of said first frame.

7. A mower adapted to be pulled along the ground by a tractor having a power take-off shaft, said mower comprising, first and second frames joined together by a hinge connection so either may pivot a predetermined amount relative to the other, a cutting blade supported on each of said frames, a gearbox supported on each of said frames including means for driving the blade on each of the frames, a main shaft connecting with one gearbox and adapted to be coupled to the tractor power take-off for transmitting power therebetween, a drive shaft connecting said two gearboxes for transmitting power therebetween, said drive shaft including a first telescoping section positioned between the gearboxes and a second telescoping section at the drive shaft end joining with one of said gearboxes, each telescoping section being adapted to shorten and lengthen as the distance between the gearboxes changes with pivoting of the frames, said drive shaft also including a universal joint positioned at each end of said first telescoping section to maintain a power transmitting connection between the drive shaft ends connected to the gearboxes as the ends are misaligned with movement of the gearboxes resulting as one of said frames is pivoted relative to the other frame to positions above and below the plane of the other frame, said universal joint that is adjacent to said second telescoping section being positioned close to the hinge connection when said one frame is pivoted to positions below the plane of the other frame to bend and maintain a clearance between the drive shaft and the hinge, and spring means to maintain said second telescoping connection in a predetermined position as said first telescoping connection telescopes to maintain said universal joint that is adjacent to said second telescoping section close to said one of said gearboxes when said one frame is pivoted to positions above the plane of said other frame thereby to maintain the bend in the universal joints generally equal.

8. A mower as defined in claim 7 wherein each telescoping connection comprises a shaft and a sleeve having a longitudinal extending opening shaped complementary to and for receiving said shaft and including means to prevent relative rotation between said sleeve and shaft.

9. A mower adapted to be pulled along the ground in a generally horizontal position by a tractor having a power take-off shaft, said mower comprising, first and second frames joined together along one edge by a hinge connection for pivoting a predetermined amount relative to each other, first and second gearboxes supported one on each frame respectively, each said gearbox including first and second gears in driving engagement and journaled to rotate about axes perpendicular to each other, a first shaft fixed to each said first gear, a cutting blade fixed to each first shaft for rotation therewith, said second gear of said first gearbox being fixed on a sleeve journaled to rotate within said gearbox, said sleeve having an opening extending therethrough along the axis of rotation thereof, a second shaft sized to fit within said sleeve opening and movable longitudinally therethrough, means connecting said second shaft and sleeve for preventing relative rotation therebetween, a telescoping section fixed to said second shaft and in driving connection with the second gear of said second gearbox, said telescoping section including a power transmitting sliding connection positioned between the second gearbox and said second shaft, a pair of universal joints connected in said telescoping section with one universal joint positioned on each side of said sliding connection, yieldable spring means acting between said second shaft and said sleeve for urging said second shaft away from said second gearbox, and power transmitting means for connecting said second gearbox and the tractor power take-off shaft whereby, with relative pivotal movement of said frames, said universal joints will bend and said telescoping section will lengthen and shorten at said sliding connection and said second shaft will slide in said sleeve to maintain a driving connection between said gearboxes.

References Cited
UNITED STATES PATENTS

| | | | |
|---|---|---|---|
| 738,991 | 9/1903 | Fawell | 74—406 |
| 1,827,126 | 10/1931 | Williams | 64—23 |
| 2,788,674 | 4/1957 | Dennys | 74—400 |
| 2,952,961 | 9/1960 | Engler | 56—6 XR |
| 3,115,738 | 12/1963 | Engler | 56—6 |
| 3,226,987 | 1/1966 | McCarty | 74—417 |
| 3,267,652 | 8/1966 | Dahlgren et al. | 56—6 |
| 3,400,521 | 9/1968 | Caldwell | 56—6 |
| 3,404,518 | 10/1968 | Kasper | 56—6 XR |
| 3,418,790 | 12/1968 | Whitfield et al. | 56—6 |
| 3,452,530 | 7/1969 | Kulak | 56—6 XR |

FOREIGN PATENTS 580,441  7/1957  Canada.

F. BARRY SHAY, Primary Examiner

J. A. OLIFF, Assistant Examiner

U.S. Cl. X.R.

74—11